United States Patent
Bailey

[15] 3,685,530
[45] Aug. 22, 1972

[54] FLOW-ACTUATED BLEED VALVE

[72] Inventor: William B. Bailey, Manchester, Conn.

[73] Assignee: The Spencer Turbine Company, West Hartford, Conn.

[22] Filed: April 13, 1970

[21] Appl. No.: 27,637

[52] U.S. Cl. ................... 137/98, 137/117, 137/499, 415/26
[51] Int. Cl. .......................................... G05d 7/00
[58] Field of Search.......... 137/98, 99, 114, 117, 499; 415/26, 27; 417/300

[56] References Cited

UNITED STATES PATENTS

| 1,281,217 | 10/1918 | Schellens | 147/300 X |
| 2,773,351 | 12/1956 | Staude | 417/300 X |
| 2,152,695 | 4/1939 | Hornschuch | 137/117 |
| 995,057 | 6/1911 | Cowles | 137/499 X |
| 1,456,391 | 5/1923 | McLaughlin | 137/117 |
| 1,990,778 | 2/1935 | Dodd | 415/26 |

FOREIGN PATENTS OR APPLICATIONS 708,419   4/1965   Canada...................137/499

Primary Examiner—Robert G. Nilson
Attorney—McCormick, Paulding & Huber

[57] ABSTRACT

A flow actuated bleed valve for a gas conveying system comprising a housing having a bleed port and mounted on the wall of a duct which defines a portion of a main gas flow path in the system. A conduit disposed within the housing and connected to the duct provides a secondary flow path between the main flow path and the port. Flow of gas in the secondary path is controlled by a movable shutter actuated by a flow responsive mechanism including a pivoted vane disposed within the duct in the main flow path. The actuating mechanism is counterbalanced so that the bleed valve may be mounted in any desired position on an associated duct.

12 Claims, 4 Drawing Figures

Patented Aug. 22, 1972
3,685,530
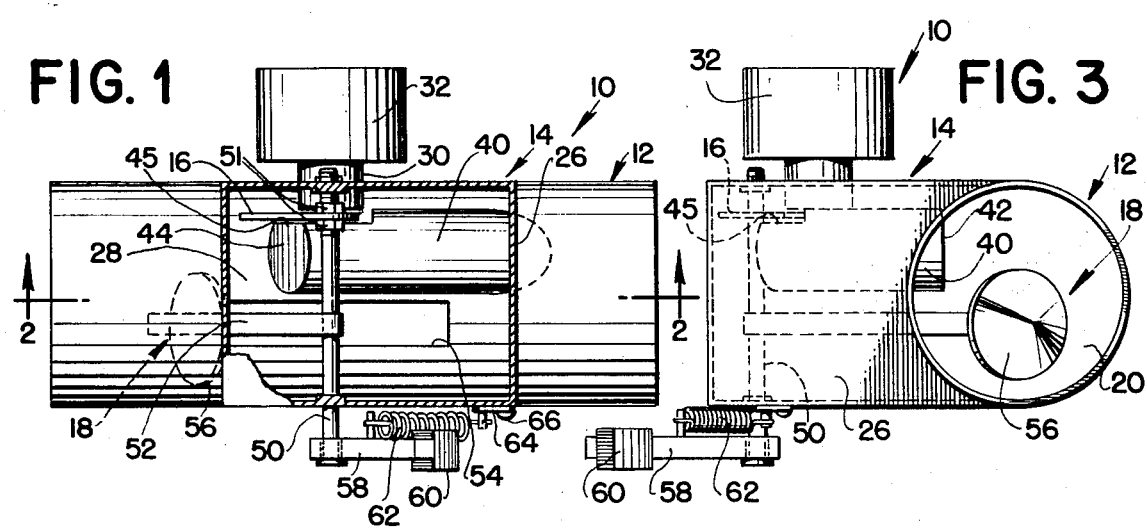
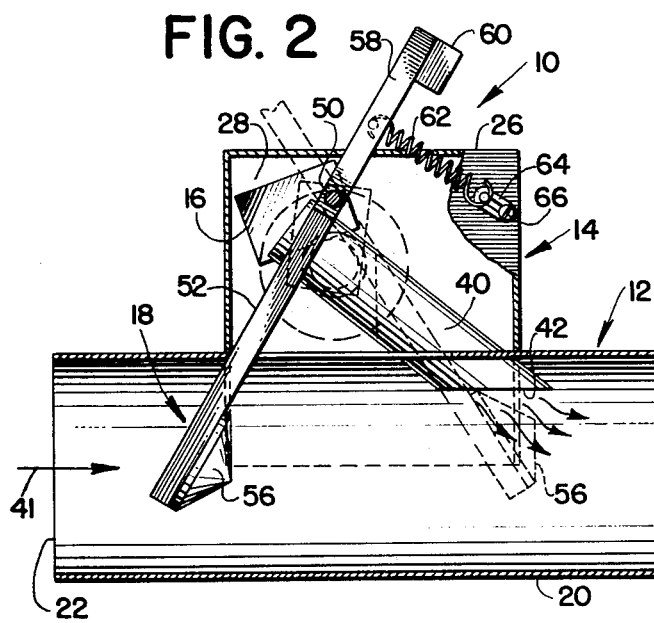
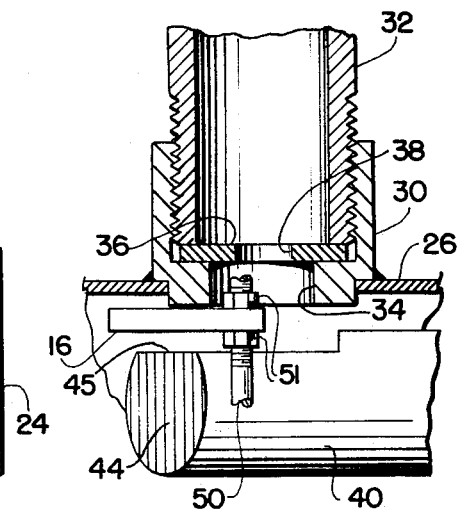
INVENTOR
WILLIAM B. BAILEY
BY *McCormick, Paulding & Huber*
ATTORNEYS

FLOW-ACTUATED BLEED VALVE

Background Of The Invention

This invention relates in general to compressible fluid or gas conveying systems and deals more particularly with an improved bleed valve for such systems.

In any system for conveying compressible fluid or gas wherein a blower, impeller or like apparatus is employed surging may be encountered. This unstable flow condition often occurs in turbo compressor, gas booster, vacuum cleaner systems and the like, when the volume of gas conveyed by the system is far below the volume which the system is designed to convey. Thus, for example, in a vacuum installation having a plurality of outlets for the connection of vacuum equipment, surging may, and often does, occur under light load conditions or when relatively few pieces of the equipment are connected to the system. This surging or reversal of flow may occur at an audible frequency to produce objectionable noise and is accompanied by reduction in system efficiency. The condition may be eliminated or at least substantially reduced by bleeding or introducing an additional volume of gas into the blower or compressor unit. In a vacuum system, for example, the condition may be controlled by bleeding atmospheric air into the system, as required, upstream of the compressor. In a closed gas conveying installation, as, for example, an installation for handling combustible gas and having a gas booster, a bypass line connected between the booster discharge line and the booster intake line will produce substantially the same result. It is the general aim of the present invention to provide an improved flow responsive bleed valve to control surging in such systems.

SUMMARY OF THE INVENTION

In accordance with the present invention, an improved flow actuated bleed valve is provided for a compressible fluid or gas conveying system. The valve is adapted for mounting on a duct which defines a main path of gas flow in the system and includes a mechanism responsive to gas flow in the main path. The mechanism operates a shutter to control the flow of gas in a secondary flow path communicating with the main flow path. The valve is constructed and arranged so that disturbing influence of the actuating mechanism upon gas flowing in the system is minimized thereby minimizing resulting turbulence within the system. The shutter operating mechanism is counterbalanced so that the valve may be mounted on an associated system in any desired orientation.

BRIEF DESCRIPTION OF THE DRAWING

FIG. 1 is a somewhat schematic view of a flow actuated bleed valve embodying the present invention and mounted on a duct comprising a portion of a gas conveying system, a portion of the valve housing being shown broken away to reveal structure therebehind.

FIG. 2 is another view of the structure shown in FIG. 1, the duct and a portion of the valve housing being shown in longitudinal section taken generally along the line 2—2 of FIG. 1.

FIG. 3 is a right end view of the structure shown in FIG. 1.

FIG. 4 is a somewhat enlarged fragmentary view of the apparatus of FIG. 1, a portion of the muffler and housing being shown in vertical section.

DETAILED DESCRIPTION OF THE PREFERRED EMBODIMENT

Turning now to the drawings, and referring particularly to FIGS. 1-3, a portion of a compressible fluid or gas conveying system embodying the present invention and designated by the reference numeral 10 includes a duct indicated generally at 12 and defining a main gas flow path. The system 10 may, for example, comprise a vacuum producing installation which includes an air impeller or turbo compressor (not shown) for inducing gas flow in the main flow path. The system also includes a flow actuated bleed valve indicated generally at 14 which is mounted on the duct 12 and cooperates therewith to provide a secondary gas flow path communicating with the main flow path. The flow of gas in the secondary path is controlled by a movable shutter 16 actuated by a mechanism indicated generally at 18 and responsive to gas flow in the main path.

The illustrated duct 12 has a generally cylindrical wall 20 and includes an inlet 22 at one end and an outlet 24 at the opposite end thereof. The bleed valve 14 has a generally rectangular inward opening housing 26 mounted on one side of the duct 12 in gas tight sealing engagement with the wall 20 and defining a chamber 28. The valve is illustrated somewhat schematically, but, in practice, the front wall of the housing 26 is preferably formed by a removable cover plate to permit access to the mechanism contained therein. A bleed port or sleeve 30 mounted on the upper wall of the housing 26 is internally threaded to receive an externally threaded part of a muffler assembly 32 as best shown in FIG. 4. At its inner end, the sleeve 30 has a reduced bore portion or orifice 34 which may determine maximum gas flow therethrough. The illustrated valve 14 includes a removable orifice plate 36 which has an orifice 38 somewhat smaller than the orifice 34. The orifice plate 36 is releasably retained in assembly with the valve 14 by cooperation of the bleed port 30 and the muffler 32 and regulates gas flow in the secondary flow path. It will be evident that flow through the bleed port 30 may be altered by simply removing the orifice plate 36 or by removing it and substituting another plate therefor which has an orifice of desired size.

A generally cylindrical bleed tube 40 intersects the wall 20 within the housing 26 and has its axis inclined to the general direction of the main flow path through the duct 12, the direction of the flow path being indicated by the arrow 41. The inner end of the tube 40 extends for some distance into the duct 12 and terminates at an opening 42 disposed in a plane generally parallel to the direction of the main flow path in the vicinity of the opening. The outer end of the tube 40 is closed by a plate 44. However, a portion of the side wall of the tube 40 is cut away near its outer end to form an opening 45 which communicates with the port 30. The tube 40 forms a passageway through the wall 20 and defines a secondary gas flow path between the main flow path and the port 30.

As previously noted, the shutter 16 and its associated operating mechanism 18 controls gas flow in the secondary flow path in response to gas flow in the main path or through the duct 12. The construction and arrangement of the shutter may vary, but, as shown, the shutter 16 comprises a generally rectangular plate supported for pivotal movement by a shaft 50 journalled by and extending transversely through the housing 26. The shutter is further arranged to pivot in a space bounded by the bleed port 30 and the tube 40. It is pivotally movable relative to the port 30 through a range of positions between an open or full line position corresponding to a maximum flow condition in the secondary path and a closed or broken line position corresponding to a no-flow condition in the latter path, as shown in FIG. 2. The distance between the shutter 16 and the opening 45 is not critical, but it is desirable for the shutter to form an effective closure for the port 30. For this reason, the shutter 16 is arranged for axial adjustment along the shaft 50 and generally toward and away from the port 30. In the illustrated construction, the shutter 16 is secured to the shaft 50 by a pair of nuts 51, 51 to facilitate such axial adjustment.

The mechanism 18 for moving the shutter 16 includes an arm 52 operably connected to the shaft 50 to pivot therewith. It should be noted that the axis of the shaft 50 extends generally transversely of the main flow path through the duct 12. The arm 52 extends for some distance into the duct 12 through an axially elongated slot 54 formed in the wall 20 and best shown in FIG. 1. A vane 56 carried by the free end portion of the arm 52 is disposed in the main gas flow path and renders the operating mechanism 18 responsive to gas flow in the latter path. The body of the vane 56 is conically shaped and converges in the general direction of gas flow in the main path or in the general direction of the arrow 41 to minimize flow turbulence. To further minimize turbulence, it will be noted that the opening 42 is spaced some distance from the vane 56 when the shutter is in its open position, so that the vane does not exert significant influence upon gas flowing in the secondary flow path.

A preferred mounting arrangement of the bleed valve 14 is illustrated. However, mounting requirements may vary, and for this reason, the operating mechanism 18 is counterbalanced so that the valve may be mounted in any orientation with respect to an associated system. An arm 58 mounted on the shaft 50 externally of the housing 26 carries a counterweight 60 which counterbalances the arm 52 and the vane 56 with respect to the axis of the shaft 50.

It will be evident that the shutter operating mechanism may be constructed and arranged to move the shutter toward either its open position or its closed position in response to flow of gas in the main flow path, and such arrangements are contemplated within the scope of the invention. In the illustrated case, a spring 62 is provided to bias the mechanism 18 toward a position corresponding to the open position of the shutter 16 so that the mechanism moves the shutter toward its closed position in response to flow in the main flow path. A slotted anchor plate 64 secured to the housing by a screw 66 is provided for adjusting tension in the spring 62 to vary the biasing force acting upon the operating mechanism 18.

Assuming that the system 10 is a vacuum producing system including a turbo compressor (not shown) and a plurality of vacuum lines (not shown) for attaching vacuum equipment to the system, the duct 12 is connected in the system upstream of the compressor and the various vacuum lines are connected in the system upstream of the duct 12. When all of the vacuum lines are in use the compressor delivers a volume of air equal to or at least approaching the volume which it is designed to deliver. Under these conditions, maximum flow will occur in the main flow path within the duct 12. This flow, acting upon the vane 56, causes the shutter 16 to move to its closed position, so that no air flows in the secondary flow path. However, when there is a light load on the system and relatively few of the vacuum lines are in service, the volume of air drawn through these lines and supplied to the compressor is substantially less than the volume which the compressor is designed to deliver. Under these conditions unstable flow or surging occurs in the system upstream of the compressor. The reduction of flow through the compressor will be accompanied by a reduction of flow in the main flow path through the duct 12. Thus, gas flowing in the main flow path will exert a lessening influence upon the vane 56 allowing the biasing spring 62 to urge the shutter 16 toward its open position. Air will enter the system from the atmosphere through the muffler 32 thence through the port 30 and the tube 40 and pass into the main flow path. This additional bleed air is introduced into the compressor and restores balance to the system.

The bleed valve of the present invention may also be used in combination with a closed gas conveying system, as, for example, a system for handling combustible gas. When the bleed valve 14 is installed in such a system, the muffler 32 is eliminated from the system and, instead, the port 30 is connected to a bypass line forming a part of the closed system.

I claim:

1. In a gas conveying system the combination comprising a duct having a wall and including an inlet and an outlet, said duct defining a main gas flow path therethrough, said wall having an opening therethrough between said inlet and said outlet, and a bleed valve including an inwardly opening housing mounted on the outer surface of said wall and cooperating therewith to define a chamber, said housing having an outwardly opening port, means defining a passageway communicating with said main gas flow path between said inlet and said outlet and with said port, said passageway and said port defining a secondary gas flow path communicating with said main gas flow path, a shutter for controlling the flow of gas in said secondary path and supported for pivotal movement about an axis extending transversely of the direction of gas flow in said main path through a range of positions between open and closed positions corresponding respectfully to conditions of maximum flow and no flow in said secondary path, said shutter in said closed position providing a closure for said port, means for moving said shutter axially toward and away from said port, an arm supported for pivotal movement about said axis and operably connected to said shutter within said chamber, said arm extending through an opening in said wall and having one portion thereof disposed in said duct and another portion thereof disposed in said chamber, and a vane carried by said one portion and disposed in said main gas flow path, said vane and said arm being responsive to gas flow in said main path for moving said shutter between its open and closed positions.

2. The combination defined in claim 1 including a bleed tube intersecting said wall between said inlet and said outlet, said tube having one end portion thereof communicating with said port and the other end portion thereof communicating with said main flow path, said tube defining said passageway.

3. In a gas conveying system the combination comprising a duct having a wall and including an inlet and an outlet, said duct defining a main gas flow path therethrough, and a bleed valve including an inwardly opening housing mounted on the outer surface of said wall and cooperating therewith to define a chamber, said housing having an outwardly opening port, a bleed tube at least partially disposed within said chamber and intersecting said wall between said inlet and said outlet, said bleed tube having one end portion thereof communicating with said port and the other end portion thereof communicating with said main gas flow path and defining a secondary flow path through said chamber between said port and said main flow path, a shutter for controlling the flow of gas in said secondary path and supported for pivotal movement about an axis extending transversely of the direction of gas flow in said main path through a range of positions between open and closed positions corresponding respectfully to conditions of maximum flow and no flow in said secondary path, said shutter in said closed position providing a closure to prevent gas flow in said secondary flow path, means for biasing said shutter toward said open position, an arm supported for pivotal movement about said axis and operably connected to said shutter, said arm extending through an opening in said wall and having one portion thereof disposed in said duct and another portion thereof disposed in said chamber, and a vane carried by said one portion and disposed in said main gas flow path, said vane and said arm being responsive to gas flow in said main path for moving said shutter toward and to said closed position.

4. The combination defined in claim 3 including means for adjusting said biasing means to vary the biasing force acting upon said shutter.

5. The combination as set forth in claim 3 wherein said vane has a generally conical body portion converging in the general direction of gas flow in said main gas flow path when the axis of said body portion is in general parallel alignment with said direction of gas flow.

6. In a gas conveying system the combination comprising a duct having a wall and including an inlet and an outlet, said duct defining a main gas flow path therethrough, and a bleed valve including an inwardly opening housing mounted on the outer surface of said wall and cooperating therewith to define a chamber, said housing having an outwardly opening port, a bleed tube at least partially disposed within said chamber and intersecting said wall between said inlet and said outlet, said bleed tube having one end portion thereof communicating with said port and the other end portion thereof communicating with said main gas flow path and defining a secondary flow path through said chamber between said port and said main flow path, a shutter for controlling the flow of gas in said secondary path and supported for pivotal movement about an axis extending transversely of the direction of gas flow in said main path through a range of positions between open and closed positions corresponding respectfully to conditions of maximum flow and no flow in said secondary path, said shutter in said closed position providing a closure to prevent gas flow in said secondary flow path, an arm supported for pivotal movement about said axis and operably connected to said shutter, said arm extending through an opening in said wall and having one portion thereof disposed in said duct and another portion thereof disposed in said chamber, a vane carried by said one portion and disposed in said main gas flow path, and means for conterbalancing said arm relative to said axis, said vane and said arm being responsive to gas flow in said main path for moving said shutter between its open and closed positions.

7. In a gas conveying system the combination comprising a duct having a wall and including an inlet and an outlet, said duct defining a main gas flow path therethrough, said a bleed valve including an inwardly opening housing mounted on the outer surface of said wall and cooperating therewith to define a chamber, said housing having an outwardly opening port, a bleed tube at least partially disposed within said chamber and intersecting said wall between said inlet and said outlet, said bleed tube having one end portion thereof communicating with said port and the other end portion thereof communicating with said main gas flow path and defining a secondary flow path through said chamber between said port and said main flow path, a shutter for controlling the flow of gas in said secondary path and supported for pivotal movement about an axis extending transversely of the direction of gas flow in said main path through a range of positions between open and closed positions corresponding respectfully to conditions of maximum flow and no flow in said secondary path, said shutter in said closed position providing a closure for said port to prevent gas flow in said secondary flow path, an arm supported for pivotal movement about said axis and operably connected to said shutter, said arm extending through an opening in said wall and having one portion thereof disposed in said duct and another portion thereof disposed in said chamber, and a vane carried by said one portion and disposed in said main gas flow path, said vane and said arm being responsive to gas flow in said main path for moving said shutter between its open and closed positions.

8. The combination defined in claim 7 including means for axially moving said shutter generally toward and away from said port.

9. The combination defined in claim 7 wherein said shutter is supported in said chamber, said shutter in said closed position being disposed between said port and said one end portion.

10. In a gas conveying system the combination comprising a duct having a wall and including an inlet and an outlet, said duct defining a main gas flow path therethrough, and a bleed valve including an inwardly opening housing mounted on the outer surface of said wall and cooperating therewith to define a chamber, said housing having an outwardly opening port, a bleed tube at least partially disposed within said chamber and intersecting said wall between said inlet and said outlet, said bleed tube having one end portion thereof communicating with said port and the other end portion thereof terminating at an opening communicating with said main gas flow path, said bleed tube defining a secondary flow path through said chamber between said port and said main flow path, a shutter for controlling the flow of gas in said secondary path and supported for pivotal movement about an axis extending transversely of the direction of gas flow in said main path through a range of positions between open and closed positions corresponding respectfully to conditions of maximum flow and no flow in said secondary path, said shutter in said closed position providing a closure to prevent gas flow in said secondary flow path, an arm supported for pivotal movement about said axis and operably connected to said shutter, said arm extending through an opening in said wall and having one portion thereof disposed in said duct and another portion thereof disposed in said chamber, and a vane carried by said one portion and disposed in said main gas flow path, said vane and said arm being responsive to gas flow in said main path for moving said shutter between its open and closed positions, said vane in a position corresponding to said open position being spaced from said opening in a direction opposite the direction of gas flow in said main gas flow path.

11. The combination defined in claim 10 wherein said tube has its axis inclined to the direction of said main flow path.

12. In a gas conveying system the combination comprising a duct having a wall and including an inlet and an outlet, said duct defining a main gas flow path therethrough, and a bleed valve including an inwardly opening housing mounted on the outer surface of said wall and cooperating therewith to define a chamber, said housing having an outwardly opening port, a bleed tube at least partially disposed within said chamber and intersecting said wall between said inlet and said outlet, said bleed tube having one end portion thereof extending for some distance into said duct and terminating at an opening disposed in a plane generally parallel to the direction of said main flow path in the vicinity of said opening, said bleed tube communicating with said main flow path and defining a secondary flow path from said port through said chamber and to said main flow path, a shutter for controlling the flow of gas in said secondary path and supported for pivotal movement about an axis extending transversely of the direction of gas flow in said main path through a range of positions between open and closed positions corresponding respectfully to conditions of maximum flow and no flow in said secondary path, said shutter in said closed position providing a closure to prevent gas flow in said secondary flow path, an arm supported for pivotal movement about said axis and operably connected to said shutter, said arm extending through an opening in said wall and having one portion thereof disposed in said duct and another portion thereof disposed in said chamber, and a vane carried by said one portion and disposed in said main gas flow path, said vane and said arm being responsive to gas flow in said main path for moving said shutter between its open and closed positions.

* * * * *

PO-1050
(5/69)

UNITED STATES PATENT OFFICE
CERTIFICATE OF CORRECTION

Patent No. 3,685,530          Dated August 22, 1972

Inventor(s) William B. Bailey

It is certified that error appears in the above-identified patent and that said Letters Patent are hereby corrected as shown below:

```
Col. 4, line 57 "respectfully" should read --respectively--.
Col. 5, line 29 "respectfully" should read --respectively--.
Col. 6, line 4, "respectfully" should read --respectively--.
Col. 6, line 22, "said" should be --and--.
Col. 6, line 37, "respectfully" should read --respectively--.
Col. 7, line 11, "respectfully" should read --respectively--.
Col. 8, line 18, "respectfully" should read --respectively--.
```

Signed and sealed this 6th day of February 1973.

(SEAL)
Attest:

EDWARD M. FLETCHER, JR.          ROBERT GOTTSCHALK
Attesting Officer          Commissioner of Patents